United States Patent
Berchtold et al.

(10) Patent No.: US 6,678,705 B1
(45) Date of Patent: Jan. 13, 2004

(54) SYSTEM FOR ARCHIVING ELECTRONIC DOCUMENTS USING MESSAGING GROUPWARE

(75) Inventors: Stefan Berchtold, Augsburg (DE); Alexandros Biliris, Chatham, NJ (US); Euthimios Panagos, Madison, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/441,284

(22) Filed: Nov. 16, 1999

Related U.S. Application Data (60) Provisional application No. 60/108,589, filed on Nov. 16, 1998.

(51) Int. Cl.[7] .............................................. G06F 17/30
(52) U.S. Cl. ...................................................... 707/204
(58) Field of Search ......................................... 707/204

(56) References Cited

U.S. PATENT DOCUMENTS

| | | | | |
|---|---|---|---|---|
| 5,890,163 A | * | 3/1999 | Todd ........................... | 707/200 |
| 5,958,005 A | * | 9/1999 | Thorne et al. ............... | 709/202 |
| 6,199,073 B1 | * | 3/2001 | Peairs et al. ................ | 707/204 |
| 6,263,121 B1 | * | 7/2001 | Melen et al. ................ | 382/305 |

FOREIGN PATENT DOCUMENTS

JP 07046271 * 2/1995

OTHER PUBLICATIONS

Microsoft Press Computer Dictionary Third Edition, 1997, Microsoft Press, 3rd edition, pp 13, 34, 35, 196, 436, and 437.*

* cited by examiner

Primary Examiner—Jack Choules (57) ABSTRACT

The present invention discloses an architecture for document archival built on network-centric groupware such as Internet standards-based messaging. Archiving and retrieving and classifying documents into meaningful collections is accomplished in a manner similar to sending email to recipients, retrieving messages from folders, and classifying messages into folder hierarchies. In the simplest scenario, if saveme.com is the archiving server's name, then sending an email to abc@saveme.com will cause the contents of the email message to be archived in the abc mailbox. The archived documents may be automatically stored in jukeboxes of non-tamperable media such as Write Once Read Multiple (WORM) Compact Disks (CD), which provide high storage capacity, low cost compared to magnetic disks, random data access, and long-term stability. The present invention leverages existing messaging infrastructures, and the resulting environment is not intrusive, easier to administer, and easier to deploy than conventional dedicated document archival systems.

14 Claims, 6 Drawing Sheets

```
ShortestSubset (documents D, values V, int N)
{
    current_size = 0; start = 0; end = 0;
    while ( current_size <= 650 )              // Find initial candidate subset
        current_size += size(D_end);
        end++;
    shortest_start = start;
    shortest_end  = end - 1;

while ( end < N )                          // Search for shorter subsets
        current_size -= size(D_start);
        start++;
        while ( current_size <= 650 )
            current_size += size(D_end);
            end++;
        if ( (V_{end-1} - V_start) < (V_{shortest_end} - V_{shortest_start}) )
            shortest_start = start;
            shortest_end  = end - 1;
    return (shortest_start, shortest_end);
}
```

Figure 7

SYSTEM FOR ARCHIVING ELECTRONIC DOCUMENTS USING MESSAGING GROUPWARE

CROSS REFERENCE TO RELATED APPLICATIONS

This application claims priority to U.S. Provisional Application Serial No. 60/108,589, filed on Nov. 16, 1998, the content of which is incorporated by reference herein.

FIELD OF THE INVENTION

The present invention relates to archiving electronic documents and, more particularly, to the use of messaging systems for the archiving of electronic documents.

BACKGROUND OF THE INVENTION

Electronic archiving of documents is an increasingly important task for most large enterprises. The ease at which electronic documents can be created by modem personal computer applications has changed the way organizations store and manage critical information. In particular, most of the organizations today keep information about their core business in an ever-increasing volume of electronic documents—including product designs and documentation, corporate policies, expense reports, purchase orders, presentations, electronic messages, and data related to electronic commerce, etc. Most of these documents need to be stored for extended periods of time (i.e., archived) because they are both related to the core business and required to ensure institutional accountability. Consequently, the ability to manage, share, and control archived documents among collaborative workgroups, workflows, business partners, and across global networks is crucial in gaining advantage in today's competitive business environment.

Although there are numerous archiving software packages available in the marketplace currently, see e.g. Aegis StarView (http://www.aegisstar.com/), DocuLive (http://www.sni.com/), Lotus Domino.Doc (http://www.lotus.com/products/dominodoc.nsf), Documentum (http://www.documentum.com/), all these systems use specialized desktop applications, proprietary technology, and/or are mostly concerned with the lifetime of documents. They are difficult to administer because new software has to be installed on practically every user's desktop, possibly thousands of computers in a large organization. Also, using a document management system for the pure purpose of archiving is disadvantageous in terms of both money and complexity of the system. Individual users and IT personnel have to learn a new technology, resulting in a substantial cost for an organization in terms of training and administration.

SUMMARY OF THE INVENTION

The present invention emanates from the recognition that organizations already have substantial investments in electronic messaging technologies, which provide the most effective methods for communication, collaboration, and coordination among workers within decentralized organizations and across different companies. Messaging has evolved from a simple communications tool, which allows users to communicate with each other, to a powerful business communication infrastructure that supports collaborative computing, business process automation, electronic commerce, and distributed work environments. Messaging is also used as the middleware for accessing and controlling shared resources, such as a printer server that receives documents as electronic mail (email) and prints a document at the appropriate printer based on the available printers, the document type, and the sender's identity.

The present invention discloses an architecture for a document archival system built on network-centric groupware such as Internet standards-based messaging. In accordance with an embodiment of the invention, archiving and retrieving and classifying documents into meaningful collections is accomplished in a manner similar to sending email to recipients, retrieving messages from folders, and classifying messages into folder hierarchies. In the simplest scenario, if saveme.com is the archiving server's name, then sending an email to abc@saveme.com will cause the contents of the email message to be archived in the abc mailbox. In another embodiment of the invention, archived documents are automatically stored in jukeboxes of non-tamperable media such as Write Once Read Multiple (WORM) Compact Disks (CD), which provide high storage capacity, low cost compared to magnetic disks, random data access, and long-term stability.

The present invention leverages existing messaging infrastructures and, thus, does not require installation of new software on every desktop. In addition, individual users and information technology personnel do not have to learn a new technology, resulting in substantial savings for an organization in terms of training and administration. The resulting environment is not intrusive, easier to administer, and easier to deploy than conventional dedicated document archival systems. These and other advantages of the invention will be apparent to those of ordinary skill in the art by reference to the following detailed description and the accompanying drawings.

DETAILED DESCRIPTION

In accordance with a preferred embodiment of the present invention, the archiving system is built on top of a messaging server such as Microsoft Exchange Version 5.5. Exchange supports many of the Internet protocols used pervasively today, such as the Internet Message Access Protocol (IMAP), the Simple Message Transfer Protocol (SMTP), and the Lightweight Directory Access Protocol (LDAP). Exchange supports addressable public folders (also referred to as shared folders) on which a rich set of access permissions can be defined. In addition, the product supports server-side scripting, which allows running programs (written in JavaScript, VBScript, C++, etc.) on the server as a reaction to events occurring in public folders, such as timer events and actions like posting, editing, or deleting a message.

Figure 1:
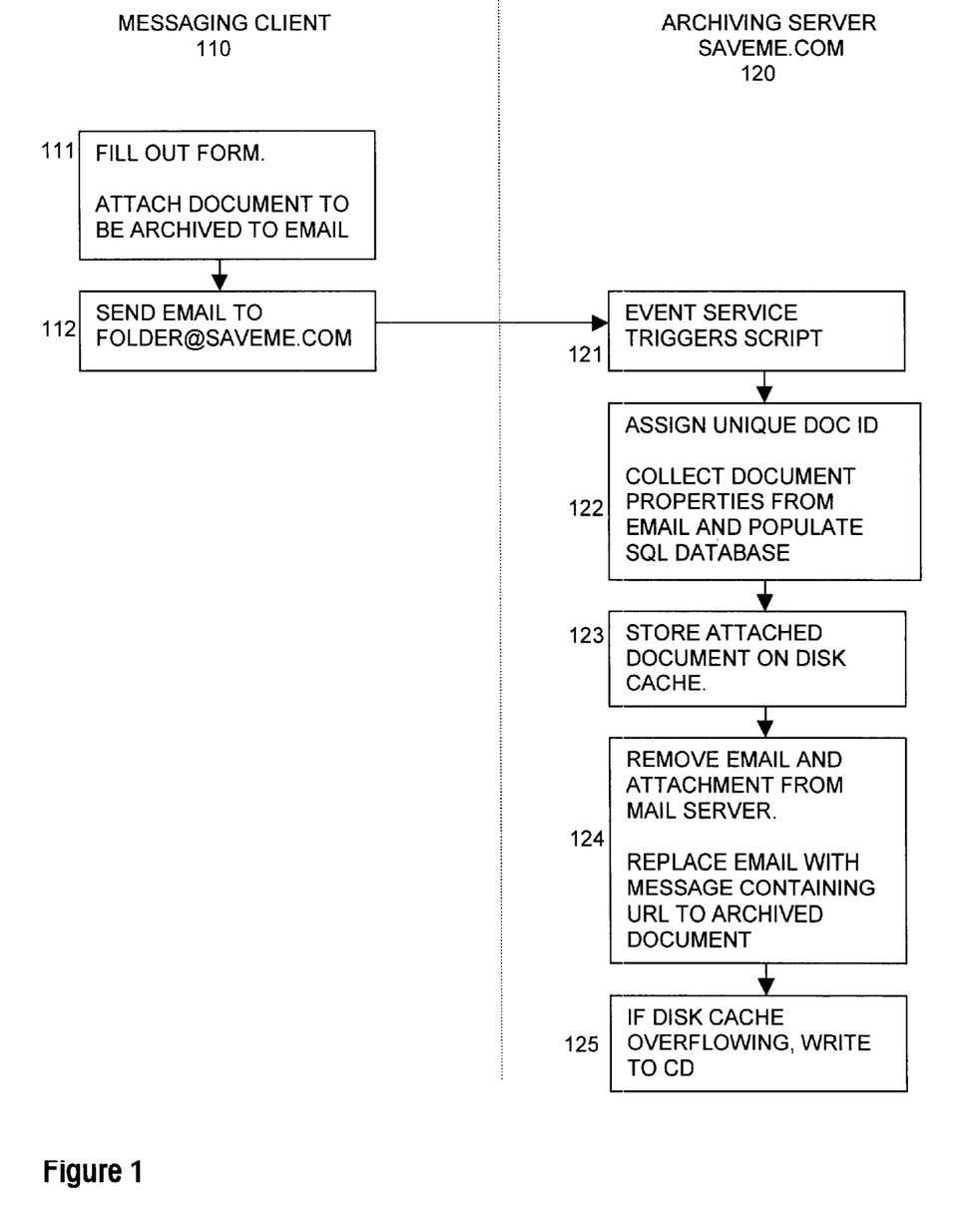
FIG. 1 is a diagram of an archival process in accordance with an embodiment of the present invention.

With reference to FIG. 1, which sets forth an example of the archiving process in accordance with a preferred embodiment of the invention, a user utilizes a messaging client 110 to designate a document to be archived. According to standard messaging protocols, email is sent to mailboxes. A mailbox is a character string (otherwise known as an email address) which identifies a user to whom mail is to be sent. Normally, mailbox names consist of user and host specifications; the standard mailbox naming convention is defined to be user@domain. At step 112, the user sends the document to be archived as an attachment to an email addressed to the public folder that should contain the document, e.g. abc@saveme.com, where abc is the name of a public folder on the archiving server saveme.com 120. This can be done by specifying the folder name in any of the To:, CC:, or BCC: fields of the email. Users can use the body of the email at step 111 to specify values for some pre-determined document attributes. For example, an expense report must specify the employee submitting the report, a dollar amount, a manager to authorize the expense, etc. This can be accomplished with the use of electronic forms—pages containing the fields that must be filled out for each document type before the document submission. One such page can be designated for each document type. These forms can be stored as regular email messages in the archiving server. In order to archive a document of a particular type, the user replies to the appropriate message, fills out the form, and attaches the document she wants to archive to the message. Then, the user can send the message to the desired public folder.

All folders in the archiving server are being monitored by the event service. At step 121, the deposit of a message in a folder triggers the Folder: : OnMessageCreated event. As a result of the triggered event, a server-side script associated with this event is invoked and is passed the folder identification and the message identifier of the newly posted message. The script at step 122 first collects the properties of the message (date, sender, etc) that can be automatically derived and assigns a unique id to the document. Then, it parses the body of the message and, if the body of the message is a form, it extracts all information contained in the form. Finally, it populates the appropriate database tables for this document. In addition, the script can also check the completeness and correctness of the submitted form by evaluating the information contained in the form and verifying that all the required ones are present (if any are missing or some constraints are violated, it can return the message to the sender and removes the message from the mail server).

Next, at step 124 the script removes the body and the attached document of the message from the email server. The document itself is stored on a separate disk cache at step 123, waiting to be written out to a durable media storage device such as a CD. The body of the message is replaced by another message containing some information about the document and an address (e.g. a Uniform Resource Locator or URL) pointing to a script that is capable of loading the actual document. Information about the exact physical location of the document (on the storage device) is advantageously maintained in a document_location table in a SQL database maintained by the archiving server. Thus, a user can click on the URL and retrieve the document at any point in time regardless of the physical location of the document. As a next step at 125, the script checks if the cache is overflowing; if this is the case, it invokes an algorithm to write a subset of the cache to a CD (further described below).

Figure 2A:
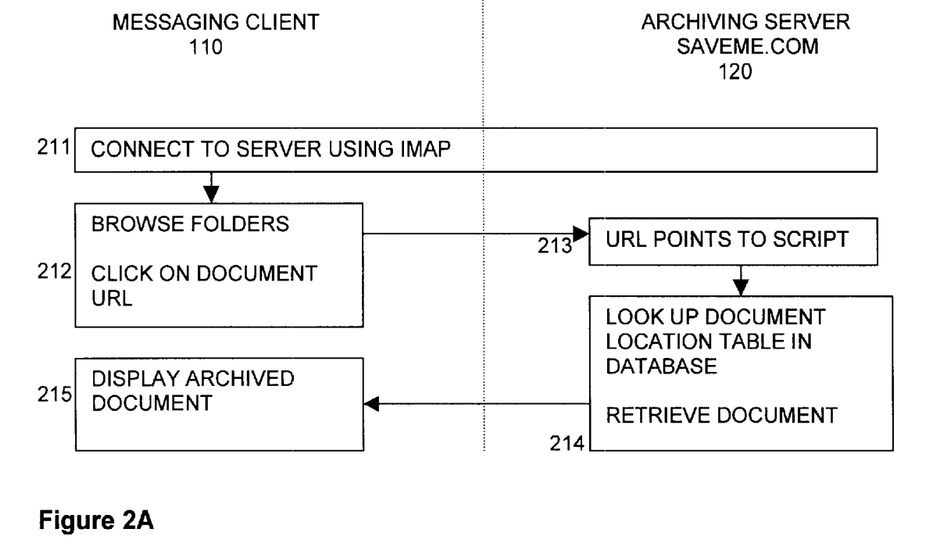
FIGS. 2A and 2B are diagrams of archived document retrieval processes in accordance with embodiments of the present invention.
Figure 2B:
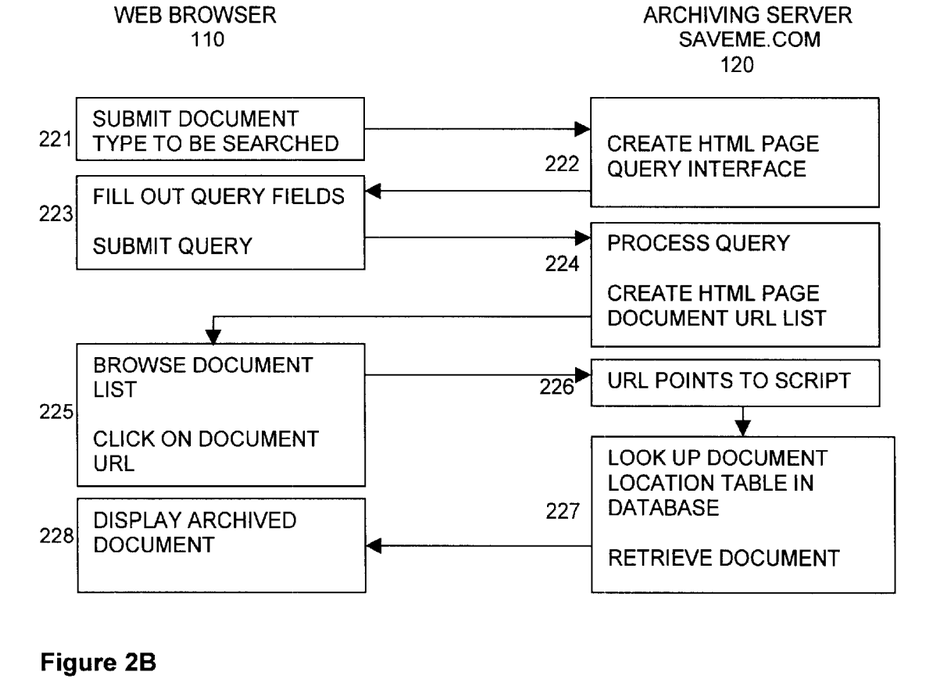

FIGS. 2A and 2B sets forth two ways by which a user can retrieve an archived document or set of archived documents, in accordance with a preferred embodiment of the invention. In FIG. 2A, the user can navigate through the document hierarchy and manually select individual documents. Since the archive folders are merely mailboxes on an email server, a standard protocol such as IMAP can be used to access and manipulate the message folders. IMAP includes operations for creating, renaming and deleting mailboxes, checking for new messages, permanently removing messages, setting various flags associated with messages, selectively fetching portions of messages and searching existing messages. See "Internet Message Access Protocol—Version 4", RFC 1730, Network Working Group 1994. The user only has to connect to the archiving server and browse through the public folders with an IMAP compliant mail client, such as the ones offered by Netscape and Microsoft. After having found the right documents, the user can retrieve a document by clicking on the URL viewed in the message body. When the URL is de-referenced, a CGI script looks up the document-location table to determine the physical location of the message and the message is then returned to the user.

Alternatively, as set forth in FIG. 2B, the user can declaratively specify a set of documents. The archiving system can then automatically retrieve the desired documents and deliver the documents to either a folder in the mail server or directly to a Web browser when a Web interface is used. The search process can be divided into two steps: First, the right document type to be retrieved can be chosen (with the choice of designating a search of all document types to allow for document type-independent queries). Second, the archiving system creates an HTML page that offers an appropriate query interface for this particular type of document. The user fills out the fields for the attributes that have been defined for this document type. An option for full text search can be offered. When the user clicks on the submit button, the appropriate CGI script is invoked. The entered values are checked for correct types and other constraints. Then, the query is processed (as further described below) and an HTML page containing the URLs of the actual documents meeting the query conditions is created. In order to transfer the documents to the client computer, the user merely has to click on the URLs.

There are four major administrative tasks that have to be performed in order to maintain the archiving server: adding and maintaining document types, maintaining the document hierarchy, managing access rights, and database administration. In order to add a new document type, the system administrator has to store the form for this type with the email server. She then has to add the appropriate tables in the database and implement appropriate scripts to parse the form and to make a sanity check on the information delivered by the user. The maintenance of the document hierarchy and management of access rights can be done through the tools that Exchange provides to manage the email server. The main task with respect to database administration is to add and delete appropriate indexes to the database.

Further discussed below in more detail are (a) the hierarchical naming scheme utilized in the present invention; (b)

alternative architectures to deal with shortcomings in standard Internet protocols; (c) database design issues to effectuate efficient declarative retrieval of documents; and (d) solutions to physical storage issues.

A. Naming Scheme

Given the vast amount of stored documents in an archiving system, document classification based on hierarchical organized collections is important for two reasons: First, it provides an easy and intuitive way to classify documents into collections and sub-collections—this helps focus the search into smaller domains. Secondly, it facilitates easy navigation through the collection of documents, especially when the criteria used to classify the documents in the first place (i.e., the schema of the hierarchy) are not known. There are many ways to organize documents into hierarchies. An example of such a hierarchy might be the organizational hierarchy of the corporation: business units, centers, and departments followed by the various document types. Another might be a first classification based on the year the document was archived, then the document types, followed by business units, centers, and departments. Note that a hierarchy may change over time—think of departments being renamed or split (new levels may have to be introduced in the hierarchy) and centers being merged (levels in the hierarchy may have to be merged). Also, hierarchies need not necessarily be stored (materialized). They could be computed views over the set of documents.

In accordance with a preferred embodiment of the present invention, a hierarchical naming scheme is utilized for both identifying collections of archived documents and for providing access paths to them. Documents are archived by storing them into folder hierarchies belonging to email recipients. For example, a document sent to the email address A/B/C@saveme.com, where saveme.com is the archiving server's name, will be archived in folder C, which is under folder B, in the hierarchy rooted at A. The hierarchy structure is maintained in a directory. Aliases can also be used to eliminate the need of specifying entire path names.

In a distributed system, multiple archiving servers can manage the folder hierarchy. Servers can be added, removed and reconfigured to accommodate load conditions and business considerations without breaking existing applications and user habits. This is achieved by allowing the naming components of a folder hierarchy to be resolved by different servers, supporting local autonomy. In particular, a name can be logically split into two parts, a prefix and a remainder. A directory service maintains information that maps the prefix to an archiving server responsible for managing the remainder. This process is applied recursively until the remainder is unambiguously resolved to a folder hierarchy managed by an archiving server. It should be noted that the two name parts may not consist of a fixed number of components, neither do they have to stay the same over time. Given a name, its prefix is identified by the directory service at the time the lookup is performed. A subsequent resolution for the same name may return a different prefix if the systems have been reconfigured. (The resolution scheme described is similar to the one originally used in file systems and domain name services where names are resolved incrementally from left to right, with the leftmost name component being resolved first, providing a context for the resolution of the second name, and so on.)

Figure 3A:
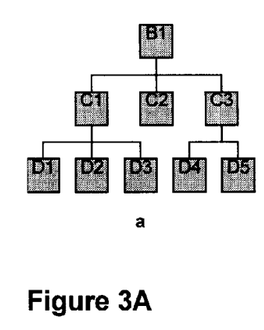
FIGS. 3A, 3B, and 3C are a diagrams representing (a) a hierarchy of folders in a server embodying the present invention, (b) another hierarchy of folders in a second server embodying the present invention, and (c) a conceptual merging of the two hierarchies with a third hierarchy to form a global hierarchy.
Figure 3B:
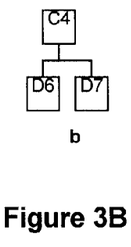
Figure 3C:
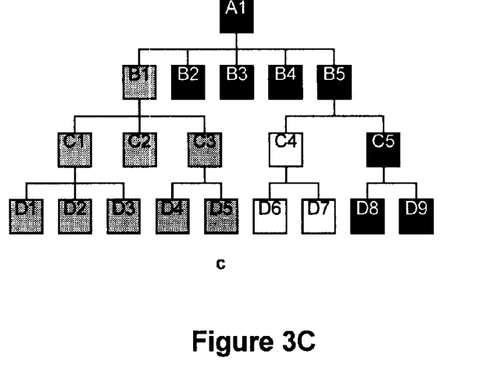

For example, FIG. 3A shows a document hierarchy managed by an archiving server on behalf of an organization. This hierarchy is rooted at B1 and the levels below the root could represent sub-units of B1 such as centers, departments, employees or projects that have been undertaken in B1 at some point in time. FIG. 3B shows the corresponding hierarchy for another organization rooted at C4 and managed by a second archiving server. Assuming that at some point in time an organization higher up than both B1 and C4 decides to employ the archiving service for its own needs and for some additional sub-units. The resulting configuration is shown in FIG. 3C. The first two servers still operate in an autonomous fashion for the hierarchies they manage. However, each one of them is able to resolve names that correspond to the entire hierarchy. The paths A1, A1/B1 and A1/B5/C4 are the possible prefixes that will be used for name resolution. Given a name, the longest prefix from the three above that matches a portion of the left part of the name is the prefix of that name. For example, the prefix of A1/B5/C5 is A1 while the prefix of A1/B5/C4/D7 is A1/B5/C4.

Figures 4A, 4B:
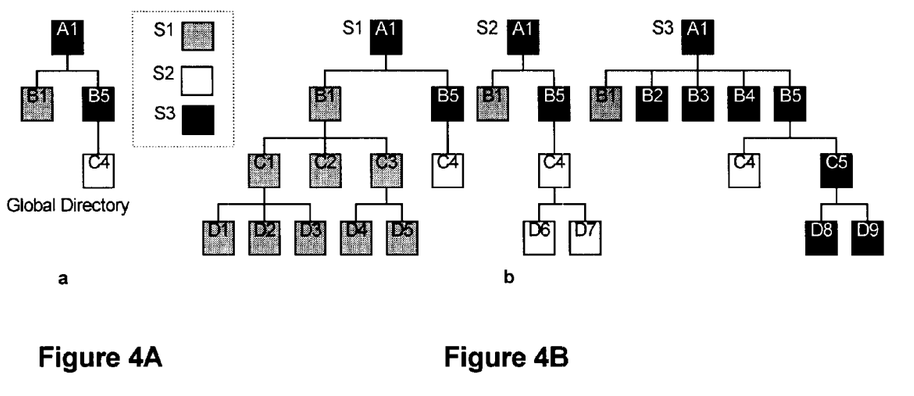
FIGS. 4A and 4B are diagrams representing alternative implementations of name resolution according to an embodiment of the present invention.

The global name resolution can be implemented as follows. Each archiving server has a directory for managing its hierarchy. A global directory keeps track the mapping between prefixes and archiving servers. Every time servers are added to or removed from the system, the global directory is updated to reflect the new mappings. However, changes to the internal structure of each directory need not propagate to the global directory as long as the path of their root to the root of the global hierarchy remains the same. FIG. 4A shows the global directory for the example shown in FIG. 3C. Every node in the hierarchy may denote a prefix (i.e., the server that maintains the hierarchy rooted at that node). However, some nodes, such as B5 in FIG. 4A, are simply intermediate paths to prefixes.

An alternative implementation would require that each server keep track of the prefixes for all other servers. FIG. 4B shows the directories S1, S2, and S3 where each one includes replicated information for the roots of the other two directories. This scheme avoids a lookup to a, possibly remote, global directory service in order to find the prefix of a name, but modifications need to propagate to each directory. As with the global directory scheme, changes to the internal structure of each directory need not propagate to the other directories as long as the path of their root to the root of the global hierarchy remains the same. The replicated scheme is better than the one that utilizes a global directory because the expected number of archiving servers that participate in a global archiving system is small, in the range of tens or even hundreds of servers for big organizations. In addition, the updates that need to propagate from one directory to the rest are also expected to be small.

B. Messaging Architecture

Although providing numerous facilities for sending, organizing and retrieving messages, Internet protocols such as SMTP and IMAP have shortcomings when it comes to supporting two features that are important for electronic archiving: (a) addressable folders anywhere in a folder hierarchy and (b) enforcing access restrictions on individual folders. In particular, IMAP does not provide sufficient access control mechanisms (although access control list extensions have been proposed), and most existing SMTP implementations do not support folder addressability. In this section, four design alternatives are disclosed based on the functionality provided by the messaging system to overcome these restrictions. The first three alternatives assume that the messaging system does not support folder addressability and access restrictions.

1. The Adjunct Approach. Using this approach, users interact directly with the messaging system—and the archival system manages the hierarchical relationships between folders and enforces access controls explicitly. The inventors refer to this approach as being "decoupled." Since the messaging system does not support folder addressability, the following alternatives can be used for archiving documents into hierarchical folders: (a) Every folder in the hierarchy corresponds to a (virtual) user (for example, a user mailbox names a/b/c could be defined to store the folder a/b/c, another mailbox to store a/b/d, etc.); (b) All documents are sent to a single predefined mailbox, and the user specifies the actual folder path in the subject or in a user-defined header attribute (e.g., X-folder). In both cases, the archival system monitors the appropriate mailboxes, extracts the folder path from the message/folder name and forwards the message, if needed, to the server responsible for managing this path. Regarding IMAP-based navigation, email clients navigate the folder hierarchies that are dynamically constructed in response to user queries. Here, users send queries to the archival system (using a Web browser) and the archival system creates folder hierarchies for those users to store the documents that satisfy the specified selection criteria and any access restrictions that may apply.

Regarding the folders that are created, there are several policies that may be used, e.g., provide each user with a mailbox and store the answer set in the mailbox. A second alternative to navigation is to maintain role-based folder hierarchies. Each such hierarchy contains sub-folders and documents that can be accessed by the corresponding role. When a document is archived, the hierarchies correspond to roles that can access the document are updated to contain a pointer to the document. While the role-based hierarchy method works with existing IMAP implementations, it does not scale well when the number of roles increases above some threshold. In this case, the number of folder hierarchies that need to be maintained may be prohibitively large, even when certain optimizations are used. In addition, role-based hierarchies are server-specific and they are not shared across multiple archive servers. If someone needs to access documents in a remote server, an IMAP connection should be established with that server—IMAP does not support multiple servers in its current specification.

Figure 5:
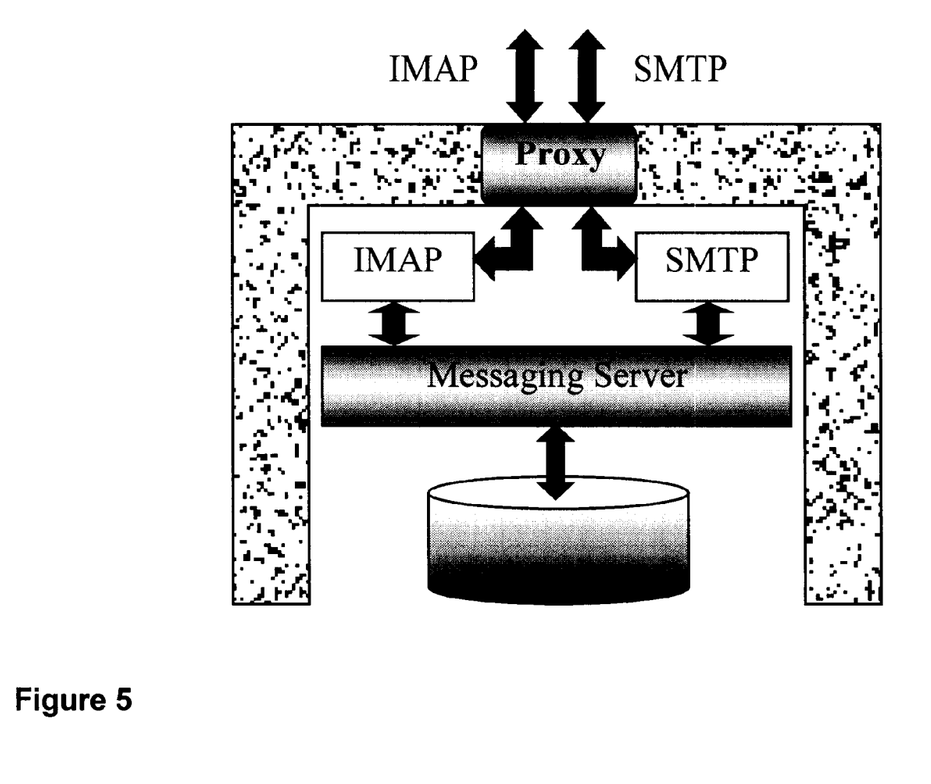
FIG. 5 is a diagram of an embodiment of the present invention utilizing a SMTP and IMAP proxy architecture alternative.

2. The Proxy-with-Mail-Server Approach. With this approach which the inventors characterize as "loosely-coupled", a proxy is placed between the users and the messaging server, as shown in FIG. 5. During document archiving, an email message containing the document is sent to an address denoting a folder hierarchy. During the recipient negotiation part of SMTP, the proxy looks up the hierarchy specified in the address of the message in a directory to determine its validity and locate the archive server responsible for this hierarchy. The directory provides DNS-like functionality, i.e.; it is be able to determine the longest prefix of an address that is handled by the server. An LDAP directory could be used for this purpose, assuming that prefix search is either implemented by the LDAP server or by a specialized wrapper, which issues multiple queries to the LDAP server. If the server is not the local one, an SMTP session can be established with the appropriate remote proxy. Otherwise, the proxy executes the following steps. First, it communicates with the archival system to get an appropriately-formatted URL to use as the message body, which would be stored with the messaging server. Next, it accepts the body of the message and stores it in the cache used for the CD jukebox. Finally, it establishes an IMAP session with the IMAP component of the messaging server and stores the modified message in the appropriate folder hierarchy.

For accessing the archived document, email clients establish an IMAP session with the local proxy. The proxy is responsible for enforcing any role-based access control restrictions that may apply to both documents and folders. In addition, the proxy may access folder hierarchies stored with remote servers, providing a unified view of the entire document archival space. The proxy relays the IMAP commands it receives from an email client to the IMAP component of the messaging system. Email clients are assumed to log onto the system using a role-name, password scheme. In addition, it is assumed that the LDAP entries that correspond to the various roles have as their mailbox entries the root folder of the hierarchy managed by the local archiving server. This implies that when a client is successfully authenticated, it can examine any folder under the root folder. The IMAP proxy enforces access control when the messaging server's IMAP server returns folder names and messages as responses to commands issued by the email client. The IMAP proxy removes from the list of returned documents the documents that are not accessible by the given role.

3. The Proxy-with-no-Mail-Server Approach. In this approach which the inventors refer to as "fully integrated", the messaging system is bypassed. The archival system communicates directly with email clients and their commands are processed internally by the archival system.

4. The Shared-Folders Approach. The last alternative, which is employed in the implementation described above, is based on the assumption that the underlying message server supports folder addressability and enforcement of access rights through public (aka shared) folders. Several messaging and groupware products, including Microsoft Exchange, Eudora WorldMail and HP OpenMail support public folders. Usually, the implementation of public folders offers a full-fledged access control mechanism on a per folder basis. The present invention, therefore, can utilize the public folder mechanism of the underlying messaging system for implementing its naming scheme and enforcing access restrictions. It should be noted, however, that shared folders do not correspond to any Internet standard and, consequently, using this approach may limit the messaging component to a small list of existing systems that offer this functionality.

C. Database Architecture and Document Retrieval

A typical archiving system used by an enterprise has to deal with huge amounts of data, practically necessitating the use of database technology. A relational database system can be used to manage the attributes associated with the archived documents, including a pointer to their physical location. As described below under section D, the actual documents are advantageously organized in a file system on CDs independently from the database system. The reason for this is that the design of commercial database systems is tightly bound to the properties of magnetic disks and, thus, CDs or even WORMs are not supported appropriately. In addition, the system should have control over the transfer of documents to CDs and their clustering.

Database Design. Since the number of archived documents is assumed to be very large, indexes require a significant space and maintenance overhead. Accordingly, the database schema must be chosen with care. As described above, a document type is a collection of attributes that describe some information about a group of documents. Obviously, given this definition, there is strong relationship between a database schema and the document types. However, there are some technical challenges: First, attributes can be either mandatory or optional. Therefore, some of the attribute values may be unknown to the system. Second, for the system, the semantics of a particular attribute is unknown. Furthermore, for practical reasons, the unique naming of attributes cannot be strictly enforced. Thus, an attribute "x" might appear in document type "1" and in document type "2" having a different meaning. Third, the number of document types might be in the order of 1,000 whereas the total number of attributes might be in the order of 10,000 for a large system.

To avoid problems with the semantics of a query specified by the user, two mechanisms are provided: First, a user interface is provided, as described in detail above, that restricts the user to meaningful queries. Second, if a query is received that contains attributes "x" and "y", documents will be returned that are only of a type that includes attributes "x" and "y". Third, when an attribute value "x" appears in a query and "x" is not present in a given document, although "x" is in the schema of this document type, the document is not included in the result. This can occur when "x" is an optional attribute.

In the present system, a document is uniquely identified within the whole system by a document ID that is attached to each document as soon as the document arrives in the system. This is the primary key of the document. For simplification, only a relatively small number of document types (e.g. up to 1000) is allowed, which all are predefined by the system administrator. She is responsible for maintaining the set of document types and for assuring that all information relevant for searching is present in the system. She also is responsible for keeping the number of document types reasonably small.

Figure 6:
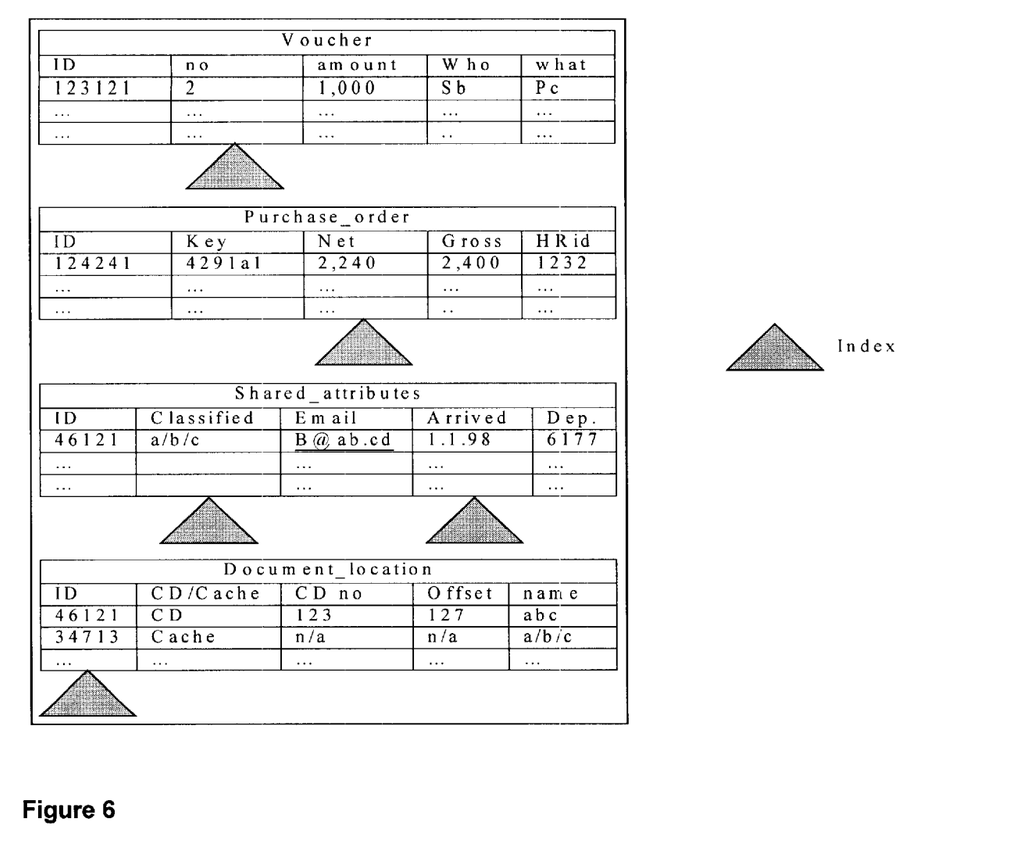
FIG. 6 is an example of the relational database design in accordance with an embodiment of the present invention.

Because of the very large number of attributes assumed to exist in the whole system, it is not feasible to use a single table for all document types. This would lead to a very sparse table since most of the attributes are unknown for most document types. Therefore, it is advantageous to assign each document type to a single table that includes the document type specific attributes. Additionally, a global table is kept that contains the attributes shared by all documents. Each table includes the document ID as a primary key. Indexes may be placed on any attribute according to the query mix and the size of the table. If a new document type is introduced into the system, the system administrator must create a corresponding table in the relational database. As the number of document types is proportional to the number of tables, this number should be reasonably small. FIG. 6 shows an example for the instant database design.

Query Processing. The following are typical queries in the archiving context that the system should be enabled to handle:

Q1. "Give me all documents that have been archived by 'Alexandros Biliris', 'Thimios Panagos', or 'Stefan Berchtold' some time in 'April 1998'".

Q2. "Give me all documents that contain the phrase 'Indexing in SaveMe'".

Q3. "Give me all documents which have been classified 'ATT/Research/Databases'".

Q4. "Give me all documents that have been archived in 'April 1998' and classified 'ATT/Research' of which the project number is 'SaveMe1' that contain the phrase 'ha, ha, hi'".

As described in detail above, queries are generally issued via an interactive query interface. The query interface performs some sanity checks such as formats of numbers or if a string represents a correct date. The query is transferred to the system as a set of attributes together with query ranges. Additionally, the query processor gets the information to what part of the hierarchy the query is restricted, and search-strings that must be contained in the resulting documents. In order to process a query that arrives in the query processor, it is necessary to consider all the three parts of the query specification: selection of attributes, selection based on the classification in the hierarchy, and full-text search. Thus, the query is split into the three parts and handled separately. Finally, the results are merged.

The full-text search portion of the query is performed first. It is assumed that a full-text search engine, such as Verity described in http://www.verity.com/products/whtpaper.htm, is available. The search engine produces a set of document IDs that point to documents satisfying the query condition, with respect to the full-text search. The selection based on the hierarchy is more sophisticated: As described in the next section, each node of the hierarchy is mapped to a string such that all nodes in a sub-tree share a common prefix. Thus, the query specification on a hierarchy can be transformed in a range query on that string. Therefore, the string can be simply included as an additional attribute "Classified" in the table of the shared attributes. For query processing, it is then possible to treat queries based on the hierarchy as range queries (prefix queries on strings can be seen as range queries) on the attribute "Classified".

As a next step, a determination is made of the set of attributes that are involved in the query. If the query specification includes the hierarchy, the attribute "Classified" is added to this set. Then, all attributes that are contained in the "Shared_attributes" table from the set are removed. Finally, a determination is made of all tables that include all attributes remaining in the set in order to generate a single SQL statement querying all affected tables. As a result of such query, a set of document Ids is again obtained. In the last step, this set of document IDs is merged with the set resulting from the full-text search, and the final result of the query is delivered back to the user. This merge step is equivalent to the intersection of two sets of document IDs. This can be done efficiently by sorting or hashing. The user has the ability to either look-up all the actual documents or to look-up only single documents. To locate a document given a document ID, the information stored in the table document_location can be utilized.

Note that an appropriate generation of indexes in the relational database system is required as in any database application. The creation of the optimal set of indexes for the given query mix and database population is the task of the system administrator as mentioned above.

Efficient Searching in Hierarchies. Several ways to index objects that are organized in a hierarchy have been discussed in the prior art. Most of these proposals focus on a small and static hierarchy where a user asks hierarchically restricted attribute queries. The most common technique is to map the position of an object in the hierarchy into a number such that all nodes in a sub-tree are assigned a number from a known disjoint interval. Then, a search on a hierarchy is reduced to a range query on this number. However, none of these proposals works on a dynamic hierarchy. Thus, the inventors propose the following simple mapping to strings instead of numbers: Suppose that each node in the hierarchy is assigned a label such that sibling nodes have different labels. If we want to denote the position of a node N in the hierarchy, we simply concatenate the labels on the path from the root node to N adding a "/" to each label. Thus, we get a string of the form "a/b/ . . . /x". If one wants to select all documents in a certain sub-tree (rooted in a node S having a label "s"), one simply has to query the database for all documents that have assigned a position "a/b/ . . . /s/*". This translates to a range ["a/b/ . . . /s", "a/b/ . . . /t"). If a document arrives in the system, the user will classify it. This means, it is assigned to a node in the hierarchy. If the document's information is inserted in the database, the according string defining the position of the document in the hierarchy is computed as described above and this attribute ("Classified") inserted with the other attributes into the according tables. In order to process a query based on the hierarchy, the sub-tree to which the query is restricted must first be determined. Then, a determination is made of the string defining the position of the root node of this sub-tree in the hierarchy, and a query is made of the database with a range query as described above.

Note that the strings that identify a position in the hierarchy may become very long. This however is not a particular problem because modern relational database systems can handle large strings easily and even the implemented index technology (usually prefix B+-trees) is not severely affected. As an extension of the above-described technique one might want to use multidimensional index technology in order to answer combined queries more efficiently. This however invokes the problem of having a multidimensional index structure storing both string and numerical attributes.

D. Physical Storage

A preferred embodiment of the present invention uses a durable media such as optical disks or CDs rather than magnetic disks as the underlying physical storage device. Apart from the legal reasons for storing data on durable media, magnetic disks are not an economical option for storing a large number of documents over a long period of time. A good physical organization of the data on the optical storage system is essential for an efficient document retrieval (search time and throughput), CD storage utilization, and bulk-drop of expired documents. Usually, optical devices contain between 100 and 1000 media (e.g. CDs), each storing about 650 Mbytes, keeping a total amount between 50 Gbytes and a few TerraBytes. A typical CD Jukebox has four reading and one writing devices and a single robot arm loading and unloading the devices. In contrast to magnetic disks, the time to access a new CD, which is not currently mounted in one of the drives, might be very long (in the order of a minute). Thus, each single retrieval process of documents should be restricted to as few CDs as possible.

The above-described implementation had the following storage hardware available: main memory in the order of 1 Gbyte, secondary storage on magnetic disks in the order of 10 Gbytes and optical storage (CD Worm) in the order of 100 Gbytes. The secondary storage is used to store the database including all indexes and as a cache for the optical disks. As CDs must be written in a single pass, it is necessary to cache 650 Mbytes on magnetic disc for each CD to be written. Thus, the available cache restricts the number of CDs that can be written simultaneously. (Given the above amounts of storage, this number is in the order of 15 disks.) Note that, although most CD writers technically allow for more than one write-process on a single CD, each additional write costs a large space overhead. Furthermore, CDs written in one step tend to be more stable over time. Therefore, it is advisable not to make use of this feature.

In order to define a good strategy to assign documents to CDs, one has to consider the following points:

1. Documents expire after an arbitrary period of time such as 1 year, 5 years, 10 years, or never. Sometimes expiration must force document deletion. For example, financial organizations need to hold credit card data for seven years, but legally they are not allowed to retain it after that time.

2. It cannot be assumed that archiving of all documents expiring in a certain year can be done in a short period of time. Rather, documents expiring in 2007 will probably be archived during 1997, 1998 and 1999.

3. In order to avoid the system to be filled with expired documents and to maintain a high storage utilization, a mechanism should be provided that allows one to discard entire CDs if all the documents stored on this CD are expired. The inventors refer to this deletion of a large set of expired documents as a "bulk-drop".

Figure 7:
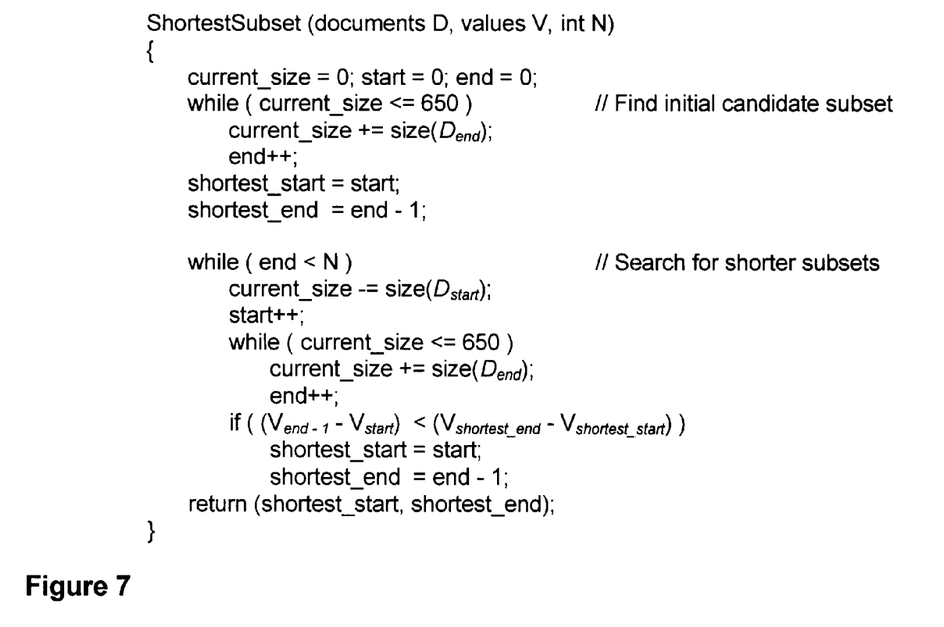
FIG. 7 is an example of an algorithm used to determine which documents to write to a CD from a disk cache.

If one looks at all these technical restrictions, there are two different criteria to optimize: On the one hand, documents should be clustered on CDs according to their expiration date; on the other hand, documents should be clustered that are frequently retrieved simultaneously. Furthermore, the query mix is unknown in advance and will definitely change over the years such that it is unknown a priori which documents will be requested together. Therefore, the inventors propose the following solution: The cache is primarily organized as a set of documents. Each document $D_i$ in the cache is assigned a value $v_i$ that can be used to cluster the document to disk. This value typically is the expiration date of the document. However, it could also be a value such as project number or even a combination of both. The documents in the cache are sorted according to these values $v_i$. A heap can be used to maintain the sorted set. If the cache overflows, a subset of the documents in the cache of size 650 Mbytes should be selected and written to disk. The algorithm set forth in FIG. 7 selects the shortest subset (with respect to the values $v_i$) containing no more than 650 Mbytes by only making a single pass through the documents stored in the cache. For clarity of the presentation, FIG. 7 omits some necessary checks for array boundaries. The algorithm is a greedy algorithm and does not necessarily lead to a globally optimal solution. However, given the various technical restrictions, an optimal solution is far from being feasible. Thus, the algorithm gives a sufficiently good solution. Furthermore, at any point in time, it is possible to reorganize a subset of documents by collecting the appropriate documents from CDs and writing new CDs. For this process of reorganizing n CDs, only a single 650 Mbyte cache is required.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A computer readable medium containing executable program instructions for performing a method of archiving electronic documents on a computer comprising the steps of:

receiving a document via a messaging protocol, the document being an attachment to an electronic mail;

determining to which mailbox on a server the document is addressed; and automatically archiving the document if the mailbox is designated as an archive folder, the archiving comprising the steps of:

storing the document on a storage device;

deleting the document and the electronic mail from the mailbox; and storing a message in the mailbox comprising an address enabling access to the stored document.

2. The computer readable medium of claim 1 wherein the messaging protocol is the Simple Message Transfer Protocol.

3. The computer readable medium of claim 1 wherein the message in the mailbox can be accessed by the Internet Message Access Protocol.

4. The computer readable medium of claim 1 wherein the address is a URL to a script which retrieves the document from the storage device.

5. The computer readable medium of claim 1 further comprising the step of storing document attributes and a location of the document on the storage device in a database.

6. The computer readable medium of claim 1 wherein the storage device is an optical media jukebox with a magnetic disk cache.

7. An electronic document archival system comprising:

a hierarchy of addressable folders; and a system for receiving electronic mail via a messaging protocol further comprising:

means for archiving documents addressed to a folder in the hierarchy, the archiving means further comprising means for extracting a folder path in the hierarchy from an electronic mail; and means for enforcing access control restrictions that apply to the folders or the contents of the folders.

8. The electronic document archival system of claim 7 wherein the system is a messaging system and the folders are public folders in the messaging system.

9. The electronic document archival system of claim 7 wherein the system is a proxy server in communication with a messaging system via a messaging protocol.

10. The electronic document archival system of claim 7 wherein the system is fully integrated with a messaging system.

11. A method of archiving documents on a durable medium comprising the steps of:

storing the documents in a cache;

assigning to each document a clustering value;

sorting the documents according to the clustering values;

when the cache overflows, selecting based on the clustering values a subset of the documents with a total size no larger than that of the durable medium and storing the subset of the documents on the durable medium.

12. The method of claim 11 wherein the clustering value comprises a document expiration date.

13. The method of claim 11 wherein the subset is shortest with respect to the clustering values.

14. The method of claim 11 wherein the durable medium is an optical compact disk.

\* \* \* \* \*